United States Patent
Wang et al.

(10) Patent No.: US 9,280,895 B2
(45) Date of Patent: Mar. 8, 2016

(54) SYSTEM AND METHOD FOR DETECTING TRAFFIC VIOLATIONS ON RESTRICTED ROADWAYS

(75) Inventors: Jigang Wang, Scottsdale, AZ (US); Kenneth M. Young, Scottsdale, AZ (US)

(73) Assignee: American Traffic Solutions, Inc., Scottsdale, AZ (US)

(*) Notice: Subject to any disclaimer, the term of this patent is extended or adjusted under 35 U.S.C. 154(b) by 804 days.

(21) Appl. No.: 13/214,063

(22) Filed: Aug. 19, 2011

(65) Prior Publication Data
US 2012/0212617 A1      Aug. 23, 2012

Related U.S. Application Data

(60) Provisional application No. 61/375,801, filed on Aug. 21, 2010.

(51) Int. Cl.
G08G 1/017      (2006.01)
G08G 1/04       (2006.01)
G06K 9/00       (2006.01)

(52) U.S. Cl.
CPC .......... *G08G 1/0175* (2013.01); *G06K 9/00785* (2013.01); *G08G 1/04* (2013.01)

(58) Field of Classification Search
CPC .................. G08G 1/04; G08G 1/0175; G08G 1/052–1/054; G06K 9/00785
See application file for complete search history.

(56) References Cited

U.S. PATENT DOCUMENTS

| | | | |
|---|---|---|---|
| 5,513,244 A | 4/1996 | Joao et al. | |
| 5,917,405 A | 6/1999 | Joao | |
| 6,542,076 B1 | 4/2003 | Joao | |
| 6,542,077 B2 | 4/2003 | Joao | |
| 6,549,130 B1 | 4/2003 | Joao | |
| 6,587,046 B2 | 7/2003 | Joao | |
| 6,647,361 B1* | 11/2003 | Laird et al. | 703/8 |
| 6,950,789 B2* | 9/2005 | Laird et al. | 703/8 |
| 6,970,102 B2* | 11/2005 | Ciolli | 340/933 |
| 7,253,731 B2 | 8/2007 | Joao | |
| 7,277,010 B2 | 10/2007 | Joao | |
| 7,397,363 B2 | 7/2008 | Joao | |
| 7,786,897 B2* | 8/2010 | Alves | 340/937 |

(Continued)

OTHER PUBLICATIONS

"New York City Rules Chapter 4, § 4-12(m)", archived at https://web.archive.org/web/20090124111106/http://nyc.gov/html/dot/downloads/pdf/trafrule.pdf, archived Jan. 24, 2009, dated Dec. 31, 2008.

*Primary Examiner* — Joseph Ustaris
*Assistant Examiner* — Zhubing Ren
(74) *Attorney, Agent, or Firm* — Stoel Rives LLP

(57) ABSTRACT

A system and method automatically detect traffic violations on roadways or portions thereof that are restricted for use only by permitted vehicles. The system comprises a controller, a vehicle sensor, and a camera. The vehicle sensor detects vehicle movement on a restricted roadway. Data from the camera and the vehicle sensor are analyzed by the controller to detect a vehicle traveling on the restricted roadway, to gather static vehicle information to determine whether the detected vehicle is permitted to use the restricted roadway, and to determine whether movements of the detected vehicle on the restricted roadway constitute a violation of traffic rules in effect on the roadway. The method captures at least one image of a vehicle on a region of the roadway, detects a vehicle in the region, collects vehicle movement information, and detects a violation of traffic rules in effect using at least the collected vehicle movement information.

30 Claims, 6 Drawing Sheets

(56) References Cited

U.S. PATENT DOCUMENTS

| | | |
|---|---|---|
| 2003/0193404 A1 | 10/2003 | Joao |
| 2003/0206102 A1 | 11/2003 | Joao |
| 2004/0160319 A1 | 8/2004 | Joao |
| 2005/0248444 A1 | 11/2005 | Joao |
| 2006/0269104 A1* | 11/2006 | Ciolli ............................ 382/104 |
| 2008/0234878 A1 | 9/2008 | Joao |
| 2009/0207046 A1* | 8/2009 | Arrighetti ...................... 340/937 |
| 2010/0328140 A1* | 12/2010 | Hong et al. ...................... 342/55 |

* cited by examiner

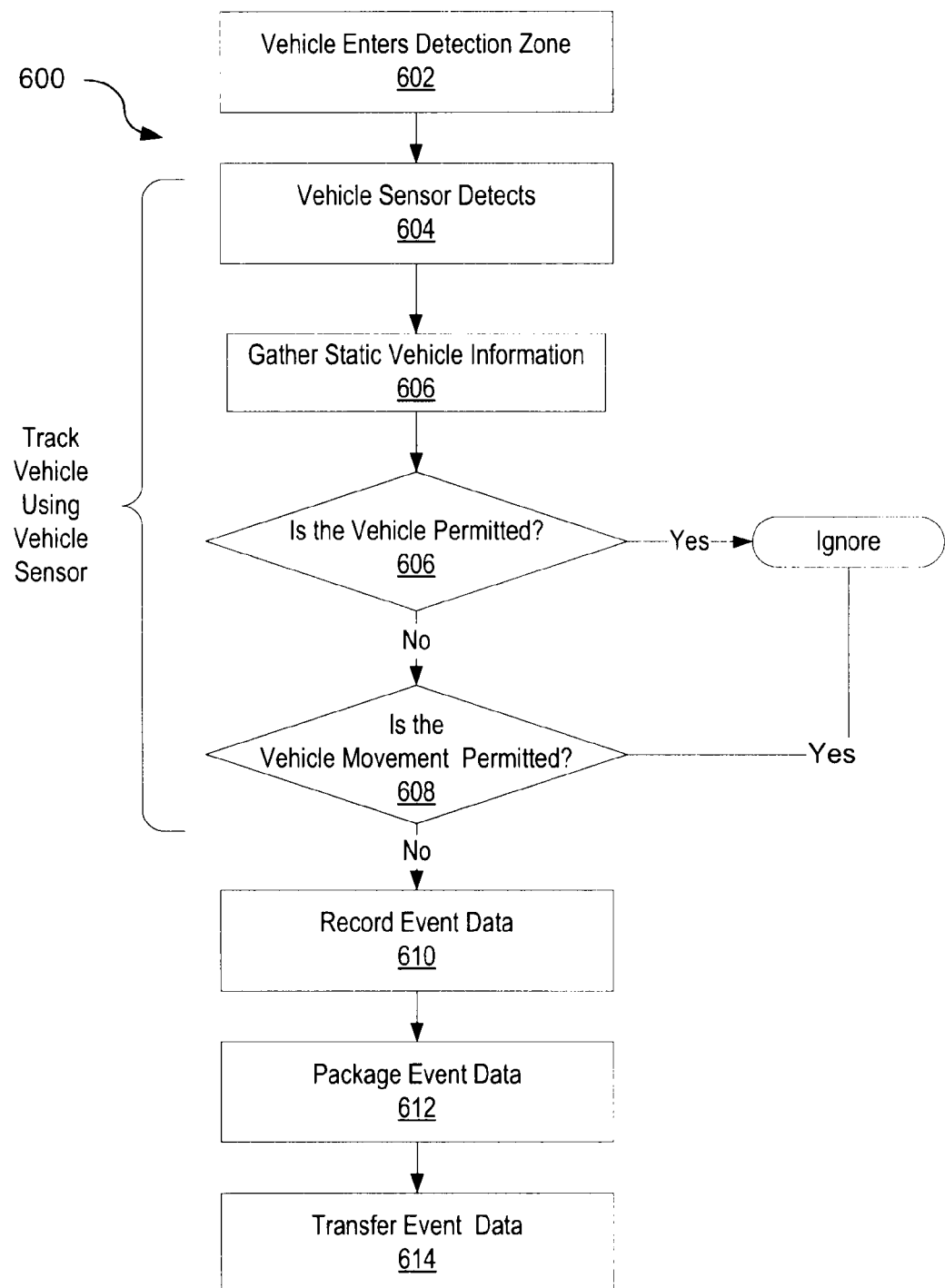

SYSTEM AND METHOD FOR DETECTING TRAFFIC VIOLATIONS ON RESTRICTED ROADWAYS

RELATED APPLICATIONS

This application claims the benefit of U.S. Provisional Application No. 61/375,801, filed Aug. 21, 2010, the entire content of which is incorporated herein by reference.

TECHNICAL FIELD

Disclosed herein are various embodiments of systems and methods for automatically detecting and recording traffic violations. More particularly, the present disclosure relates to a system and method for automatically detecting and recording traffic violations on roadways that are restricted to use only by vehicles that meet certain vehicle type, occupancy, movement, or other operating requirements.

BRIEF DESCRIPTION OF THE DRAWINGS

FIG. 6 is a flow chart of one embodiment of a method for detecting traffic violations by tracking a vehicle's movement using a single vehicle detection sensor configured to track a vehicle as it travels through a detection zone on a restricted roadway.

DETAILED DESCRIPTION

Overview

Figure 1:
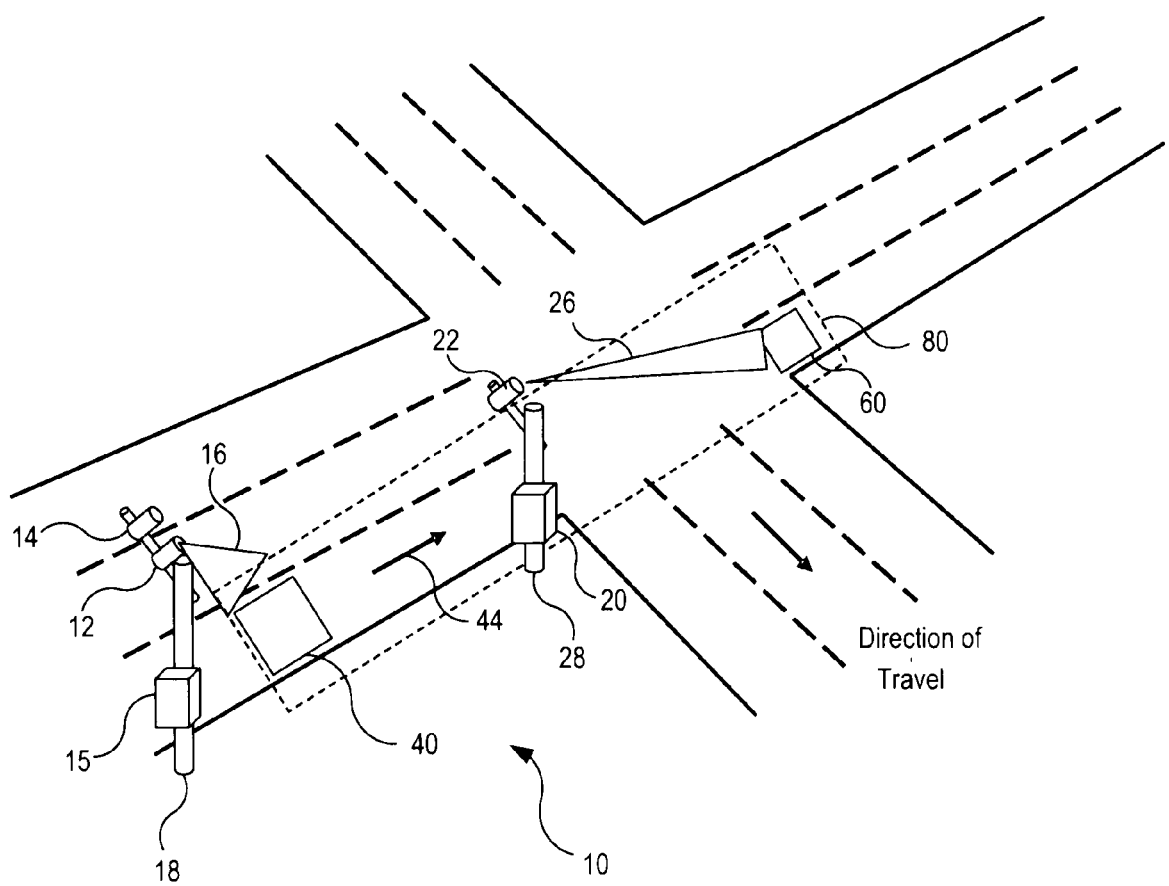
FIG. 1 is a perspective view of one embodiment of a system for detecting traffic violations on restricted roadways.

Systems and methods for detecting and recording traffic violations on restricted roadways where violations are defined based on both static vehicle information and vehicle movement information are disclosed herein.

To provide safe and efficient transport services to road users, certain roadways are restricted to use only by vehicles that meet certain vehicle type, occupancy, movement, or other operating requirements. Examples of such restricted roadways include bus lanes or bus only lanes that are restricted to use only by certain types of vehicles such as buses or taxicabs, high-occupancy vehicle (HOV) lanes where the lanes are designated for exclusive use by high-occupancy vehicles for all or part of a day, and roadways that are restricted to use only by vehicles that meet certain weight limit or clearance requirements. Certain vehicles may be generally permitted to use restricted roadways. For example, buses and taxi cabs may generally be permitted to use a bus/HOV lane. Other vehicles may be permitted to make only limited use of restricted roadways. For example, traffic rules in effect on a restricted roadway may allow for all vehicles to use a bus/HOV lane for a limited distance in order to make a turn. In another example, traffic rules in effect on a restricted roadway may allow for all vehicles to use a bus/HOV lane to pick up or drop off a passenger. Accordingly, an automated system for detecting a violation of traffic rules in effect on the restricted roadway must distinguish between permitted and prohibited motion.

Traffic enforcement on restricted roadways may involve enforcement officers observing the traffic on the restricted roadway, identifying vehicles in violation of the restricted roadway traffic rules, and then taking appropriate actions. This manual approach requires human resources that may not be available to many enforcement agencies. Therefore, automated enforcement systems may provide efficiencies and advantages not available to those with limited financial resources by automatically detecting and recording traffic violations on roadways that are restricted to use only by vehicles that meet certain vehicle type, occupancy, movement, or other operating requirements.

According to various embodiments, an automated enforcement system may comprise one or more vehicle sensors (adapted to gather vehicle identification and detect vehicle movement), a controller, and one or more cameras. The vehicle sensor(s) detect vehicles traveling on the restricted roadway and gather vehicle information. The controller operates in conjunction with the one or more vehicle sensors to determine if a detected vehicle is in violation of the traffic rules, based on the vehicle information and vehicle movements on the roadway. The controller operates with the one or more cameras to capture photographs and/or videos of the vehicle that is detected in violation of the traffic rules. The system may further include an optional communication module that allows users to access the device locally and remotely through wired or wireless networks. Through the communication module, the system further provides mechanisms for manual and automated transmission of captured data from the system to a local and/or remote storage device.

Various components of an automated enforcement system may be mounted on a pole or overhead mast arm adjacent to the monitored roadways. The system may be capable of detecting and recording traffic violations continuously under all-weather conditions, or it may be configured to operate according to a schedule (i.e., during specific hours on specific days, or on a variable basis).

One example of the automated enforcement system is an automated bus lane camera system, which may be capable of detecting vehicles traveling on bus lanes, classifying them into permitted or not permitted classes, determining if their uses of the bus lanes constitute violations of the bus lane traffic rules based on vehicle classes and movements in and around the monitored bus lanes, and recording evidential data when violations are detected by the system.

According to one embodiment, a system automatically detects traffic violations on roadways or portions thereof that are restricted for use only by permitted vehicles. The system comprises a controller, a vehicle sensor, and a camera. The vehicle sensor detects vehicle movement on a restricted roadway. The data from the camera and the vehicle sensor are analyzed by the controller to detect a vehicle traveling on the restricted roadway and to gather static vehicle information to determine whether the detected vehicle is permitted to use the restricted roadway. The data from the camera and the vehicle sensor are also analyzed by the controller to determine whether movements of the detected vehicle on the restricted roadway constitute a violation of traffic rules in effect on the roadway.

According to another embodiment, a method automatically detects traffic violations on a roadway that is restricted for use only by permitted vehicles. The method captures at least one image of a vehicle on a region of the roadway. The method detects a vehicle in the region. The method also collects vehicle movement information in the region. The method then detects a violation of traffic rules in effect on the roadway using at least the collected vehicle movement information.

According to yet another embodiment, a system automatically detects traffic violations on a roadway that is restricted for use only by permitted vehicles. The system comprises means for monitoring a region of the restricted roadway, means for detecting a vehicle in the region, means for collecting vehicle movement information in the region, and means for detecting a violation of traffic rules in effect on the roadway using at least the collected vehicle movement information. The means for detecting a vehicle may optionally fuse different types of vehicle sensors to gather accurate and rich vehicle information. The means for detecting a vehicle may comprise, for example, one or a fusion of multiple sensors, including ALPR cameras that are capable of automatic license plate recognition, 3D laser scanners that are capable of vehicle classification based on 3D vehicle profiles, video-based vehicle sensors that are capable of vehicle detection, classification, and tracking, radar sensors that are capable of multiple object detection and tracking, laser-based sensors for vehicle height detection, intelligent loop sensors that are capable of vehicle identification and classification, and intelligent magnetic sensors that are capable of vehicle identification and classification.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, "an embodiment" may be a system, an article of manufacture (such as a computer-readable storage medium), a method, and/or a product of a process.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include one or more local area networks, wide area networks, metropolitan area networks, and/or Internet or Internet protocol (IP) networks, such as the World Wide Web, a private Internet, a secure Internet, a value-added network, a virtual private network, an extranet, an intranet, etc. In particular, a suitable network may be formed from parts or entireties of two or more other networks, including networks using disparate hardware and network communication technologies. A network may incorporate landlines, wireless communication, and combinations thereof.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The software modules described herein tangibly embody programs, functions, and/or instructions that are executable by computer(s) to perform tasks as described herein. Suitable software, as applicable, may be provided using the teachings presented herein and programming languages and tools, such as XML, Java, Pascal, C++, C, database languages, APIs, SDKs, assembly, firmware, microcode, and/or other languages and tools. Additionally, software, firmware, and hardware may be interchangeably used to implement a given function.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

As one skilled in the art will appreciate in light of this disclosure, certain embodiments may be capable of achieving certain advantages, including some or all of the following: (1) reducing or eliminating human involvement in detecting violations of traffic rules in effect on restricted roadways; (2) reducing or eliminating the number of false-positive identifications of violations by automated systems for detecting traffic violations on restricted roadways; and (3) providing improved documentation and evidence of violations.

Illustrated Embodiments

FIG. 1 illustrates a perspective view of one embodiment of a system 10 for detecting traffic violations on restricted roadways. In more detail, referring to FIG. 1, the restricted roadway camera system 10 comprises a first vehicle sensor 12, a camera 14, a first cabinet 15 that houses processing, storage, and network devices associated with the first vehicle sensor 12, a second vehicle sensor 22, and a second cabinet 20 that houses processing, storage, and network devices associated with the second vehicle sensor 22. According to the illustrated embodiment, first vehicle sensor 12 and camera 14 are mounted on an overhead mast arm or on a pole 18 adjacent to the restricted roadway that is being monitored by the system 10. The cabinet 15 may also be mounted on the pole 18. The second vehicle sensor 22 may be mounted on an overhead mast arm or on a pole 28 adjacent to the restricted roadway that is being monitored by the system 10. The distance between the sensor 12 and sensor 22 may be determined by the maximum distance that a vehicle is allowed to travel in the restricted roadway, as specified in the traffic rules. Or the sensor 22 may be placed near an exit area for the purpose of detecting whether a vehicle exits the restricted roadway or stays on the roadway after traveling past the exit area.

The first vehicle sensor 12 and the second vehicle sensor 22 are capable of detecting vehicles and providing vehicle information. The vehicle information may include vehicle license plates, vehicle classes, vehicle heights, vehicle weights, or other types of information that uniquely identifies a vehicle.

The first vehicle sensor 12 and the second vehicle sensor 22 comprise ALPR cameras that can be configured to detect and recognize vehicle license plates in the first region 40 and the second region 60, respectively, as indicated in the monitored traffic lane. The beam 16 and the beam 26 illustrate the ALPR cameras' field of view, respectively. The arrow 44 illustrates the direction of travel on the monitored roadway. In one example, the ALPR camera may comprise one infra-red camera for ALPR and one color overview camera that is capable of producing color images.

The ALPR camera may detect every vehicle that travels through region 40, read the vehicle license plate, and produce one or more images of the detected vehicle and/or the vehicle's license plate. The ALPR camera may also produce one or more color images of the vehicle. The ALPR camera may also be configured to produce videos of detected vehicles. Various image enhancements may be performed, such as cropping of the images.

According to one embodiment, the camera 14 may comprise a camera that is capable of capturing photographs and/or videos of the monitored traffic. The region 80, in dash lines, illustrates one possible field of view for the camera 14. The camera 14 may be embodied as an analog video camera, a network video camera, and/or a high-resolution digital camera.

The first vehicle sensor 12 and second vehicle sensor 22 may each comprise an ALPR system and a laser scanner that is capable of producing 3D profiles of vehicles traveling through its beam. The laser scanner is capable of classifying vehicles into appropriate vehicle classes and matching vehicles based on their 3D profiles. The first vehicle sensor 12 and the second vehicle sensor 22 may comprise one or a fusion of multiple sensors, including ALPR cameras that are capable of: ALPR; 3D laser scanners that are capable of vehicle classification based on 3D vehicle profiles; video-based vehicle sensors that are capable of vehicle detection, classification, and tracking; radar sensors that are capable of multiple object detection and tracking; laser-based sensors for vehicle height detection; intelligent loop sensors that are capable of vehicle identification and classification; and intelligent magnetic sensors that are capable of vehicle identification and classification.

Figure 2:
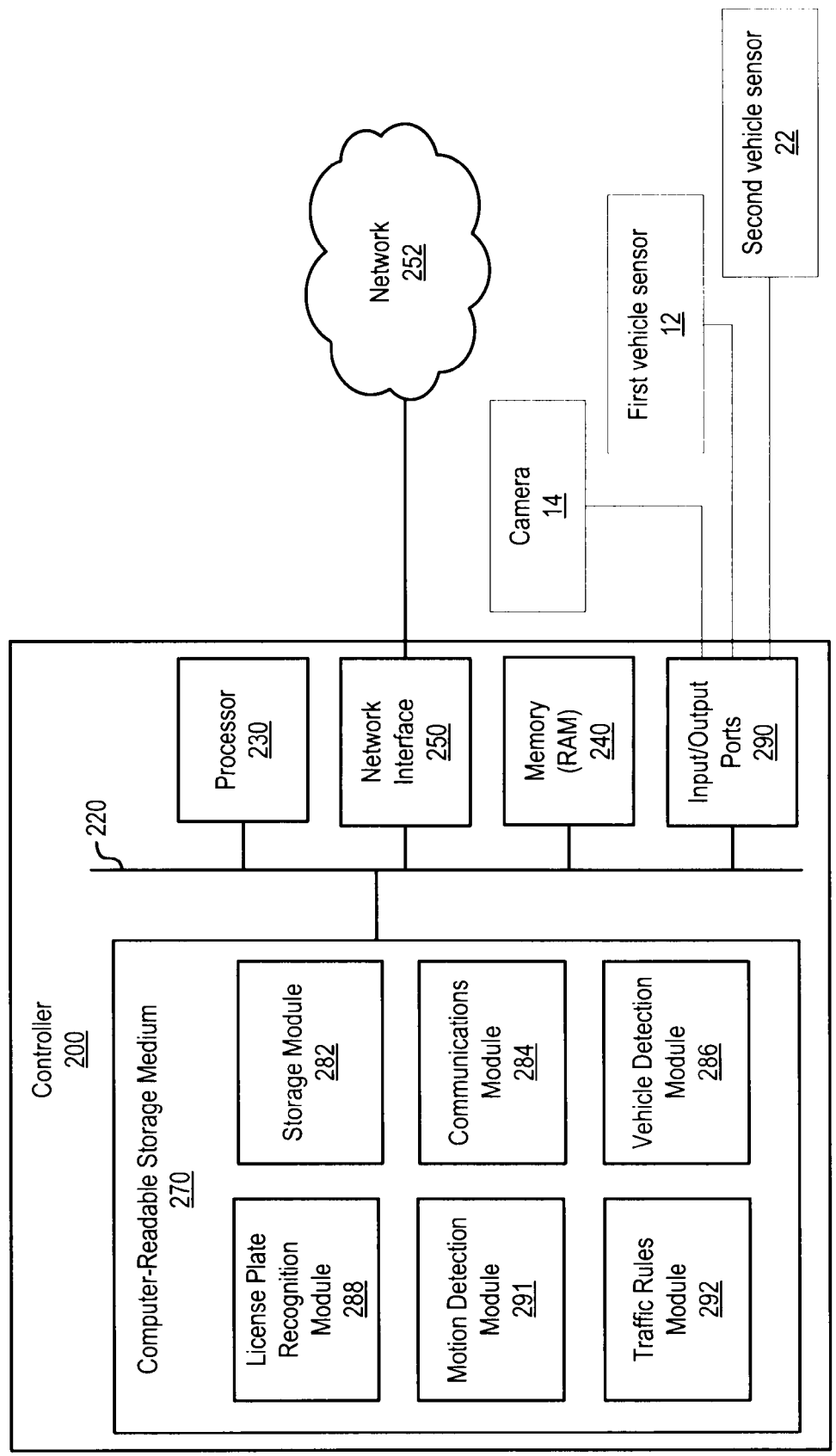
FIG. 2 is a functional block diagram of one embodiment of a computer system for detecting traffic violations on restricted roadways.

FIG. 2 shows a functional block diagram for the components of one embodiment of a system 10 for detecting traffic violations on restricted roadways. According to the illustrated embodiment, the system 10 comprises a controller 200, a camera 14, a first vehicle sensor 12, and a second vehicle sensor 22. According to the illustrated embodiment, the controller 200 includes a processor 230, memory (RAM) 240, a network interface 250, and a computer-readable storage medium 270, which are all connected via a system bus 220.

The processor 230 may be configured to execute instructions stored on the computer-readable storage medium 270, to process communications received via the network interface 250, and to process data received via the input/output ports 290. The processor 230 may operate using any number of processing rates and architectures. The processor 230 may be configured to perform various algorithms and calculations described herein. The processor 230 may be embodied as a general purpose integrated circuit, an application specific integrated circuit, a field-programmable gate array, and other programmable logic devices.

The network interface 250 and the input/output ports 290 may allow for communication between the controller 200 and a plurality of connected devices. The network interface 250 may be embodied using a variety of interfaces for various types of physical media (e.g., optical fiber, twisted pair, or coaxial cable). Further, the network interface 250 may be configured to allow communications according to a variety of communications protocols and speeds. The network interface 250 may allow for communication with a network 252, which may be connected to remote devices (not shown).

The input/output ports 290 may be configured to allow for communication between the controller 200 and a plurality of other devices, such as the camera 14, the first vehicle sensor 12, and the second vehicle sensor 22. The input/output ports 290 may be embodied as standard connections (e.g., USB, IEEE 1394, HDMI, RS-232 connections, etc.) or proprietary connections. A plurality of input/output ports 290 may be provided in order to facilitate communication with a plurality of devices.

The computer-readable storage medium 270 may be the repository of software modules 282-292. According to various embodiments, each of modules 282-292 may be alternatively implemented using hardware, firmware, software, and/or a combination thereof. The storage module 282 may be configured to encode and store still images and/or video images received from the camera 14. Further, the storage module 282 may allow for remote access to images and/or videos. The communications module 284 may allow for communication according to a variety of communication protocols. The vehicle detection module 286 may be configured to detect a vehicle within a detection zone based on input from the camera 14, the first vehicle sensor 12, or the second vehicle sensor 22. The license plate recognition module 288 may be configured to analyze data received from the camera 14, the first vehicle sensor 12, and/or the second vehicle sensor 22, in order to determine the license plates of vehicles in a detection zone. The motion detection module may be configured to determine the motion of a detected vehicle within a detection zone based on data received from the camera 14, the first vehicle sensor 12, and/or the second vehicle sensor 22. The motion detection module 291 may be configured track vehicles as they move through a detection zone. Depending on the type of sensors used with system 10, the motion detection module may continuously track a vehicle, or it may identify the same vehicle using different sensors at different locations within the detection zone. The traffic rules module 292 may be configured to determine whether the motion of a detected vehicle within a detection zone, or other characteristic of a vehicle (e.g., weight, height, occupancy, etc.) complies with traffic rules in effect on a monitored roadway.

Figure 3:
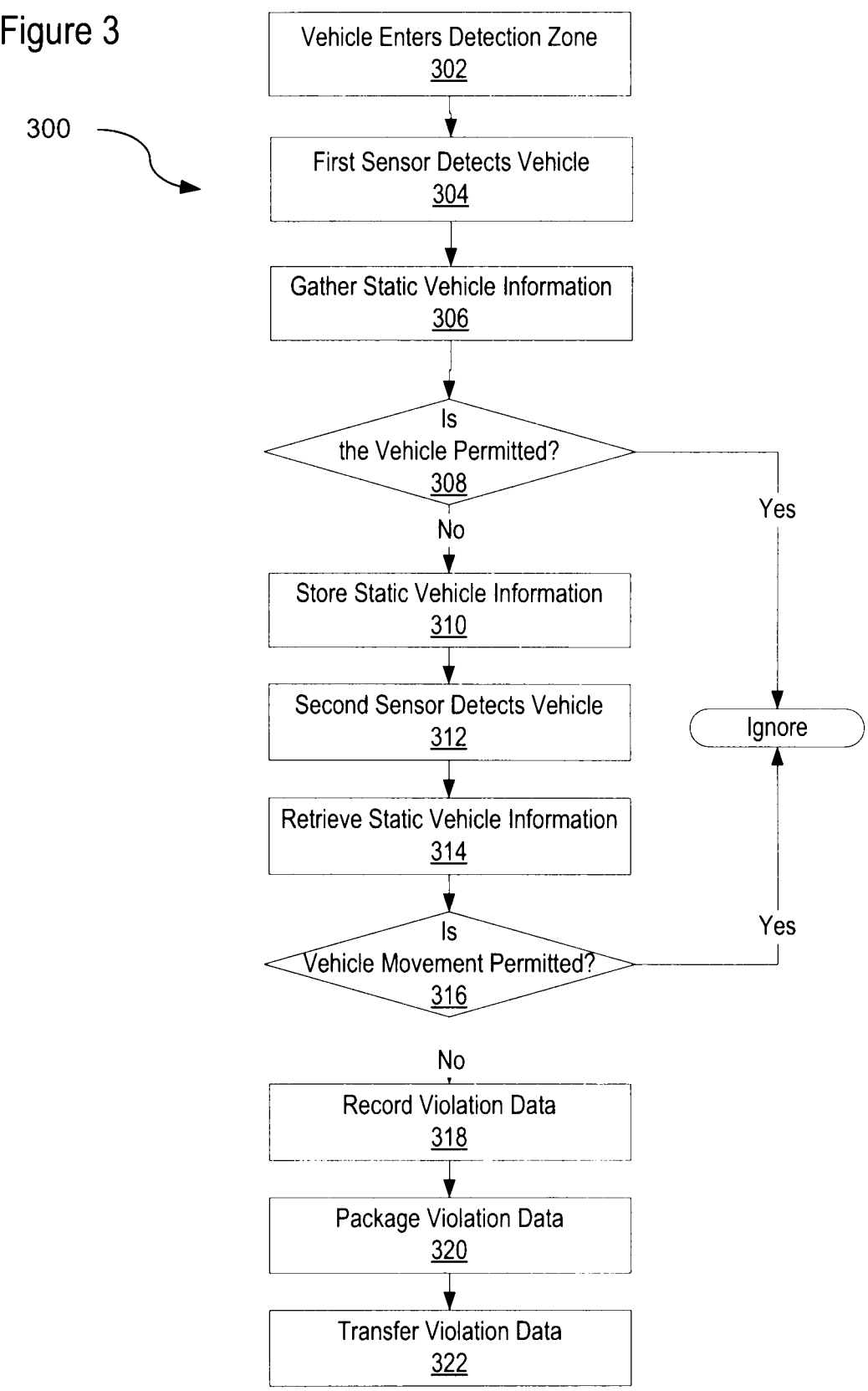
FIG. 3 is a flow chart of one embodiment of a method for detecting traffic violations based on a vehicle's movement on a restricted roadway using multiple vehicle sensors.

FIG. 3 is a flow chart of one embodiment of a method 300 for detecting traffic violations based on a vehicle's movement on a restricted roadway. The flow chart illustrates how a system, such as system 10 illustrated in FIG. 1, may capture vehicles that are not allowed to use the restricted roadway using a first vehicle sensor, a second vehicle sensor, a camera, and a controller. At 302, a vehicle enters a detection zone of a system for detecting violations of traffic rules in effect on the restricted roadway. Following the entry of a vehicle into the detection zone, a first sensor detects the vehicle at 304. At 306, the first sensor may gather static vehicle information (e.g., license plate number, vehicle size, vehicle color, vehicle weight, vehicle size, occupancy, etc.) that can be used to identify a vehicle as it passes through the detection zone. According to various embodiments one or more types of static vehicle information may be gathered and analyzed. According to various embodiments, a single piece of static vehicle information (e.g., a license plate) may be gathered and analyzed, or several pieces of static vehicle information may be gathered and analyzed. Optionally, a detected vehicle may be classified by comparing static vehicle information with known information associated vehicles or classes of vehicles. For example, records associated with a vehicle's license plate may also indicate the vehicle's color, make, and model. The make and model of the vehicle provide an indication regarding the size and weight of the vehicle.

Based on the static vehicle information gathered by the first sensor, it may be determined whether the vehicle is permitted to use the restricted roadway. For example, if the restricted roadway is a bus lane, and the detected vehicle is determined to be a bus, method 300 may ignore the motion of the bus. The static vehicle information may be compared to a database containing static vehicle information associated with vehicles that are permitted to use the restricted roadway, and it may be determined whether the detected vehicle is permitted to use the restricted roadway at 308. The determination of whether a vehicle is a permitted vehicle may be based on a vehicle's license plate, the number of occupants in a vehicle, a vehicle's weight, or other characteristic. If the vehicle is not permitted, static information about the vehicle may be stored at 310.

As the detected vehicle moves through the detection zone, the second sensor detects the vehicle at 312. After the second sensor detects the vehicle, static information about the vehicle may be retrieved at 314. The movement of the detected vehicle between the point of detection by the first vehicle sensor and the point of detection by the second vehicle sensor may allow for a determination of whether the vehicle's movement is permitted at 316. For example, a system may be implemented in a location where a vehicle may use a restricted lane for making a right turn. The first vehicle sensor may be positioned to detect the vehicle in a restricted lane before the turn, and the second vehicle sensor may be positioned to detect the vehicle, if the vehicle remains in the restricted lane, after the turn. Failure to detect the vehicle by the second vehicle sensor indicates that the vehicle turned, and accordingly, the vehicle's movement was permitted. If the system determines that the detected vehicle's movement is permitted, the detected vehicle's use of the restricted roadway may be ignored and the sensor data and video can be deleted. In another example, traffic rules in effect on a restricted roadway may allow for use of a bus/HOV lane by any vehicle in order to pick up or drop off a passenger. If the same vehicle has been detected by both the first vehicle sensor and the second vehicle sensor within a specified distance, it may be determined that a violation has occurred. If the vehicle is detected only by the first vehicle sensor, and not by the second vehicle sensor, a system implementing method 300 may ignore the detected vehicle's use of the restricted roadway.

If the detected vehicle's movement is not permitted, violation data may be recorded at 318. The recorded data may include the static vehicle information, the date and time of the violation, a description of the violation, and images or videos of the detected vehicle in the detection zone. The violation data may be packaged at 320 and transferred at 322. For example, a system implementing method 300 may transfer violation data to a local traffic enforcement agency using a data network.

Figure 4:
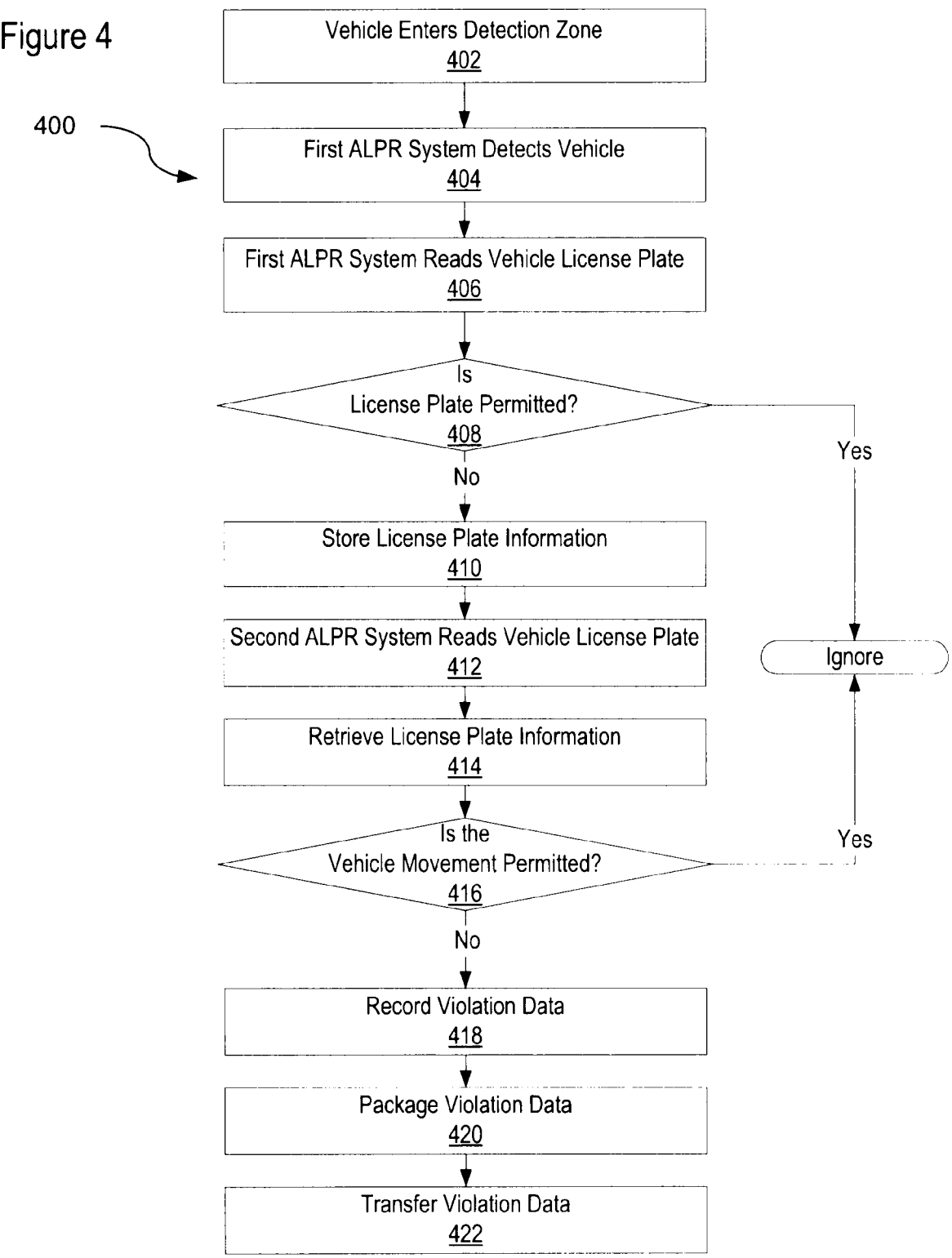
FIG. 4 is a flow chart for one embodiment of a method for detecting traffic violations on a restricted roadway using multiple automatic license plate recognition ("ALPR") systems.

FIG. 4 is a flow chart of a method 400 that illustrates the operation of one embodiment where a first vehicle sensor and a second vehicle sensor comprise ALPR systems. Like the method 300 illustrated in FIG. 3, the method 400 determines whether a violation of traffic rules in effect on a roadway occurs based upon static vehicle information (e.g., a license plate number) and based on the movement of the detected vehicle within a detection zone. An ALPR system may comprise an ALPR camera and a processing unit that is configured to identify and read a license plate within the field of view of the ALPR camera.

At 402, a vehicle enters a detection zone of a system for detecting violations of traffic rules in effect on the restricted roadway. Following the entry of a vehicle into the detection zone, the first ALPR system detects the vehicle at 404. At 406, the ALPR system reads the vehicle license plate. The license plate may be compared to a database of license plates associated with vehicles that are permitted to use the restricted roadway, and it may be determined whether the license plate is permitted at 408. If the license plate of the detected vehicle is not permitted, the license plate information may be stored at 410.

As the detected vehicle moves through the detection zone, the second ALPR system detects the vehicle at 412. After the second sensor detects the vehicle, the license plate of the vehicle detected by the second ALPR system may be retrieved at 414. The movement of the detected vehicle between the point of detection by the first ALPR system and the point of detection by the second ALPR system may allow for a determination of whether the vehicle's movement is permitted at 416. If the detected vehicle's movement is not permitted, violation data may be recorded at 418. The violation data may be packaged at 420 and transferred at 422.

Figure 5:
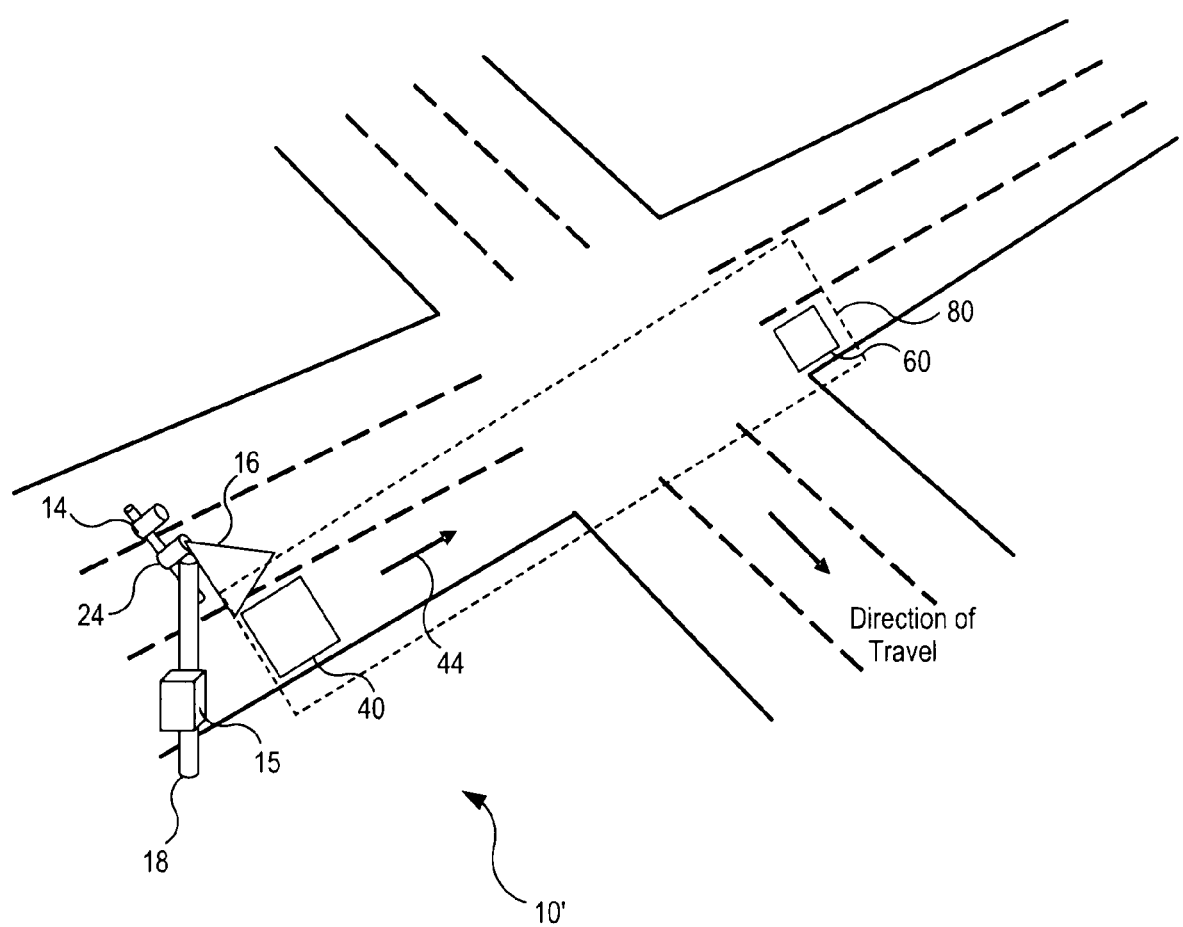
FIG. 5 is a perspective view of one embodiment of a system for detecting traffic violations on a restricted roadway.

FIG. 5 is a perspective view of one embodiment of a system 10' for detecting traffic violations on a restricted roadway. The system 10' comprises a vehicle sensor 24, camera 14, and one cabinet 15 that houses processing, storage, and network devices, and other accessories. According to the illustrated embodiment, the vehicle sensor 24 and camera 14 are mounted on an overhead mast arm or on a pole 18 adjacent to the roadway that is being monitored by the system 10'. The cabinet 15 may also be mounted on the pole 18. A beam 16 illustrates the field of view of the vehicle sensor 24. The arrow 44 illustrates the direction of travel on the monitored roadway.

The sensor 24 may comprise a vehicle detection means that is able to detect vehicles, collect vehicle information such as license plate numbers, classes, heights, weights, or other vehicle identification information, and tracking vehicle movements on the monitored roadway. The sensor 24 may detect every vehicle that travels through region 40, The collected vehicle information such as license plate number, classes, heights, weights, or other vehicle identification information, may be used to determine if a vehicle is permitted to use the restricted roadway. The vehicle movement information provided by the detection means may be used to determine if the detected vehicle movements are permitted by the traffic rules. For example, the vehicle movement information provided by the sensor 24 can be used to determine if a vehicle stays on the restricted roadway through the monitored region 80 or if it exits the restricted roadway before zone 60.

In one example, the sensor 24 comprises an ALPR camera and a video analyzer that is capable of detecting and tracking vehicles in the video camera's field of view. In another example of the preferred embodiment, sensor 24 comprises an ALPR camera and a 3D radar sensor that is capable of detecting and tracking multiple vehicles. The sensor 24 may further comprise a weigh-in-motion sensor and a 3D radar sensor that is capable of detecting and tracking multiple vehicles. In another example, sensor 24 may comprise an intelligent loop sensor that is capable of vehicle classification and identification and a 3D radar sensor that is capable of detecting and tracking multiple vehicles. Finally, the sensor 24 may comprise an intelligent loop sensor that is capable of vehicle classification and identification and a video-based vehicle sensor that is capable of detecting and tracking multiple vehicles.

FIG. 6 is a flow chart of one embodiment of a method 600 for detecting traffic violations by tracking a vehicle's movement using a single vehicle detection sensor and a camera on a restricted roadway. The method 600 may be implemented using a single sensor that is configured to identify a vehicle and track the vehicle while the vehicle moves through a detection zone. At 602, a vehicle enters a detection zone of a system for detecting traffic violations of traffic rules in effect on the restricted roadway. Following the entry of a vehicle into the detection zone, the vehicle sensor detects the vehicle at 604. At 606, the vehicle sensor may gather static vehicle information (e.g., a license plate number, a vehicle size, a vehicle color, a vehicle weight, a vehicle size, an occupancy, etc.) that can be used to identify a vehicle as it passes through the detection zone. According to various embodiments, a single piece of static vehicle information (e.g., a license plate) may be gathered and analyzed, or several pieces of static vehicle information may be gathered and analyzed.

The static vehicle information may be compared to a database containing static vehicle information associated with vehicles that are permitted to use the restricted roadway, and it may be determined whether the detected vehicle is permitted to use the restricted roadway at 608. If the detected vehicle is permitted to use the restricted roadway, further movement of the vehicle may be ignored. If the vehicle is not permitted to use the restricted roadway, the vehicle sensor may be configured to track the vehicle as it moves through the detection zone to determine whether the vehicle's movement constitutes a permitted use of the restricted roadway.

As the detected vehicle moves through the detection zone, the movement of the vehicle may be used to determine whether the vehicle's movement is permitted at 608. If the detected vehicle's movement is not permitted, violation data may be recorded at 610. The violation data may be packaged at 612 and transferred at 614.

Multiple variations and modifications are possible in the embodiments of the various embodiments described here. Although certain illustrative embodiments have been shown and described here, a wide range of changes, modifications, and substitutions is contemplated in the foregoing disclosure. While the above description contains many specific details, these should not be construed as limitations on the scope of the disclosure, but rather exemplify one or another preferred embodiment thereof. In some instances, some features may be employed without a corresponding use of the other features. Accordingly, it is appropriate that the foregoing description be construed broadly and understood as being illustrative only, the scope of the invention being limited only by the claims which ultimately issue from this application. The above description provides numerous specific details for a thorough understanding of the embodiments described herein. However, those of skill in the art will recognize that one or more of the specific details may be omitted, modified, and/or replaced by a similar process or system.

What is claimed:

1. An automated system for detecting traffic violations on a restricted roadway by determining whether vehicles' static information provides permission for unrestricted use of the restricted roadway, and, for a vehicle lacking permission for unrestricted use of the restricted roadway, determining whether a type of movement of the vehicle on the restricted roadway otherwise permits the vehicle to make temporary use of the restricted roadway and thereby absolves an operator of the vehicle from a traffic violation, the system comprising:

a camera system configured to monitor traffic in and around a restricted roadway;

a vehicle sensor configured to detect vehicle movement on the restricted roadway; and a controller configured to:

receive data from the camera system and the vehicle sensor, detect from the data a vehicle traveling in the restricted roadway, in response to detecting a vehicle traveling in the restricted roadway, gather static vehicle information that represents a non-moving physical attribute of the vehicle to identify, based on the non-moving physical attribute of the vehicle and irrespective of its movement on the restricted roadway, whether the vehicle is a member of a non-permitted class of vehicles that, under a traffic rule, are allowed specified limited usage of the restricted roadway, the specified limited usage including passenger exchange and temporary travel through the restricted roadway, and analyze the data to determine for an identified member of the non-permitted class whether the member's use of the restricted roadway constitutes a violation of the traffic rule by tracking movement of the identified member and determining whether the movement is a permissible exercise of the specified limited usage.

2. The system of claim 1, wherein the controller is further configured to identify the vehicle based on at least one of a vehicle type, occupancy of a vehicle, or operating requirements of a vehicle.

3. The system of claim 1, wherein the controller is further configured to identify whether a detected vehicle has permission to make unlimited use of the restricted roadway by identification of the detected vehicle as being at least one of a bus, a taxi, a high occupancy vehicle, a vehicle having a weight under a permitted limit, or a vehicle having a height under a permitted limit.

4. The system of claim 1, wherein the restricted roadway comprises at least one of a bus lane, a taxi lane, a high-occupancy vehicle (HOV) lane, a roadway with a weight limit, or a roadway with a clearance limit.

5. The system of claim 1, wherein the vehicle sensor comprises at least one of an automatic license plate recognition (ALPR) system, a vehicle class identification system, a vehicle occupancy identification system, a vehicle weight determination system, or a vertical height determination system.

6. The system of claim 1, wherein the camera system comprises a still camera and the controller is adapted to control the camera system to capture a photograph of a detected vehicle in violation of the traffic rule.

7. The system of claim 1, wherein the camera system comprises a video camera and the controller is adapted to control the camera system to capture a video of a detected vehicle in violation of the traffic rule.

8. The system of claim 1, further comprising a communication module adapted to enable remote access to the system.

9. The system of claim 8, wherein the communication module is further adapted for automated transmission of captured data from the system to a remote storage device.

10. The system of claim 1, wherein the system is adapted to be mounted, at least in part, on a pole adjacent to the restricted roadway.

11. The system of claim 1, wherein the system is adapted to be mounted, at least in part, on an overhead mast arm.

12. The system of claim 1, adapted for continuous operation under all-weather conditions.

13. The system of claim 1, adapted for detecting and recording traffic violations for extended periods of the day, during specific hours on specific days, or on a variable basis.

14. The system of claim 1, wherein the camera system comprises a first camera and the vehicle sensor comprises a first vehicle sensor, the system further comprising:
first and a second vehicle sensor to detect vehicle movement; and
a second camera;
wherein the first vehicle sensor and the first camera are located in a first detection zone, and the second vehicle sensor and the second camera are located in a second detection zone.

15. The system of claim 14, wherein the distance between the first detection zone and the second detection zone corresponds to a maximum distance that members of the non-permitted class are allowed to travel in the restricted roadway, according to the traffic rule.

16. The system of claim 14, wherein the second detection zone is placed near an exit from the restricted roadway, and wherein the controller is adapted to determine whether the vehicle exits the restricted roadway.

17. The system of claim 1, further comprising an automatic license plate recognition (ALPR) system adapted to detect and read a license plate of the vehicle.

18. The system of claim 17, wherein the ALPR system is further adapted to produce an image of the vehicle and an image of the license plate of the vehicle.

19. The system of claim 17, wherein the ALPR system comprises a video camera and a video analyzer adapted to detect and track the vehicle in the video camera's field of view.

20. The system of claim 19, wherein the ALPR system is further adapted to produce videos of the vehicle.

21. The system of claim 17, wherein the ALPR system comprises a camera and a 3D radar sensor that is adapted to detect and track multiple vehicles.

22. The system of claim 1, further comprising a weigh-in-motion sensor and a 3D radar sensor for detecting and tracking multiple vehicles.

23. The system of claim 1, further comprising an intelligent loop sensor that is adapted to classify and identify vehicles and a 3D radar sensor that is capable of detecting and tracking multiple vehicles.

24. The system of claim 1, further comprising an intelligent loop sensor that is adapted to classify and identify vehicles and a video-based vehicle sensor that is adapted to detect and track multiple vehicles.

25. A method for detecting traffic violations on a restricted roadway by determining whether vehicles' static information provides permission for unrestricted use of the restricted roadway, and, for a vehicle lacking permission for unrestricted use of the restricted roadway, determining whether a type of movement of the vehicle on the restricted roadway otherwise permits the vehicle to make temporary use of the restricted roadway and thereby absolves an operator of the vehicle from a traffic violation, the method comprising:
monitoring traffic in and around a restricted roadway;
detecting a vehicle traveling in the restricted roadway;
in response to detecting a vehicle traveling on the restricted roadway, gather static vehicle information that represents a non-moving physical attribute of the vehicle;
identifying, based on the non-moving physical attribute of the vehicle and irrespective of its movement on the restricted roadway, whether the vehicle is a member of a non-permitted class of vehicles that, under a traffic rule, are allowed specified limited usage of the restricted roadway, the specified limited usage including passenger exchange and temporary travel through the restricted roadway; and
determining for an identified member of the non-permitted class whether the member's use of the restricted roadway constitutes a violation of the traffic rule by tracking movement of the identified member and determining whether the movement is a permissible exercise of the specified limited usage.

26. The method of claim 25, further comprising:
capturing an image evidencing the violation.

27. The method claim 26, further comprising:
capturing date, time, and location information associated with the violation.

28. The method of claim 26, further comprising:
transferring data regarding the violation to a remote system.

29. The method of claim 25, further comprising:
determining for the vehicle at least one of whether a weight of the vehicle is under a permitted weight limit, whether a height of the vehicle is under a permitted height limit, whether the occupancy of the vehicle exceeds an occupancy requirement, or whether a class of the vehicle satisfies a vehicle class requirement.

30. An automated system for detecting traffic violations on a restricted roadway by determining whether vehicles' static information provides permission for unrestricted use of the restricted roadway, and, for a vehicle lacking permission for unrestricted use of the restricted roadway, determining whether a type of movement of the vehicle on the restricted roadway otherwise permits the vehicle to make temporary use of the restricted roadway and thereby absolves an operator of the vehicle from a traffic violation, the system comprising:
means for monitoring traffic in and around a restricted roadway;
means for detecting a vehicle traveling in the restricted roadway;
means for gathering static vehicle information in response to detecting a vehicle traveling on the restricted roadway, the static vehicle information representing a non-moving physical attribute of the vehicle;
means for identifying, based on the non-moving physical attribute of the detected vehicle and irrespective of its movement on the restricted roadway, whether the vehicle is a member of a non-permitted class of vehicles that, under a traffic rule, are allowed specified limited usage of the restricted roadway, the specified limited usage including passenger exchange and temporary travel through the restricted roadway; and means for determining, for an identified member of the non-permitted class, whether the member's use of the restricted roadway constitutes a violation of the traffic rule by tracking movement of the identified member and determining whether the movement is a permissible exercise of the specified limited usage.

* * * * *